United States Patent [19]
Jeong

[11] Patent Number: 5,953,305
[45] Date of Patent: Sep. 14, 1999

[54] METHOD FOR DETECTING MIRROR SIGNAL AND THE SAME CIRCUIT

[75] Inventor: Seong Gab Jeong, Kyunggi-Do, Rep. of Korea

[73] Assignee: LG Electronics Inc., Seoul, Rep. of Korea

[21] Appl. No.: 08/975,929

[22] Filed: Nov. 21, 1997

[30] Foreign Application Priority Data

Nov. 23, 1996 [KR] Rep. of Korea .................. 1996-56873

[51] Int. Cl.$^6$ ...................................................... G11B 7/00
[52] U.S. Cl. ............................................................. 369/124
[58] Field of Search ................................ 369/124, 54, 59, 369/44.34, 44.32

[56] References Cited

U.S. PATENT DOCUMENTS 5,841,751 11/1998 Komazaki et al. ..................... 369/124
5,854,781 12/1998 Kurihara ................................. 369/124

*Primary Examiner*—Thang V. Tran

[57] ABSTRACT

A mirror signal detecting method and apparatus which can detect a mirror signal accurately even though a disc has a defect area. A low pass filter filters a high frequency signal obtained from the disc having tracks arranged between each mirror region. The low pass filter removes a noise component caused by the defect area included in the high frequency signal. An intermediate voltage of the high frequency signal filtered by the low pass filter is detected and compared with the high frequency signal to detect a mirror signal.

18 Claims, 3 Drawing Sheets

RFS

TS

BS

MS

METHOD FOR DETECTING MIRROR SIGNAL AND THE SAME CIRCUIT

BACKGROUND OF THE INVENTION

1. Field of the Invention

This invention relates generally to a disc driver for driving a disc, and more particularly to a method for detecting a mirror signal from a disc and a circuit therefor.

2. Description of the Prior Art

In recent, a disc accessed optically, such as a compact disc(CD) and a digital versatile(or video) disc(DVD), has been widely used as a recording medium. Generally, in this disc, tracks for recording an information are provided in a concentric or spiral shape and mirror regions for totally reflecting a light beam exist between the track. The mirror regions allow the disc driver to perform an appropriate control by indicating a boundary between the tracks. Signal pits are recorded in each of the track.

Further, the disc driver has an additional function, such as a time search and a variable bit rate control, besides a basic function of recording and reproducing an information on and from the disc. In order to perform the time search and the variable bit rate control, the disc driver must frequently move (or jump) from a track being currently accessed into a track spaced by several to tens of tracks therefrom. The disc driver must detect the jumped track number such that it can be moved into a desired track at the time of track-jumping. To this end, the disc driver must detect a signal that changes as the track and the mirror region are alternated, hereinafter referred to as a mirror signal. The mirror signal has a small amplitude when a light beam is positioned on the track while it has a large amplitude when a light beam is positioned on the mirror region. This results from a light beam being partially reflected by the track while being totally reflected by the mirror region. Since such a mirror signal is detected from a radio frequency signal generated at a pickup reading tracks of a disc in the radial direction, by means of a mirror signal detecting circuit, it is influenced by a driving condition of the disc and a state of the disc. Particularly, if a defect area due to dusts or scratches or the like occurs in the disc, then the mirror signal includes an error so that it can not temporarily indicate the track and the mirror region. This is caused by a fact that the mirror signal detecting circuit responds instantaneously with respect to a noise of impulse component involved in the radio frequency signal by the defect area.

In real, as shown in FIG. 1, the conventional mirror signal detecting circuit includes a first operational amplifier 11 for receiving a radio frequency signal RFS, and a signal detection and hold part 12 and a second operational amplifier 13 which are connected to the operational amplifier 11 in serial. The radio frequency signal RFS is generated at a pickup, not shown, for converting a light signal reflected from the disc into an electrical signal, and which has a waveform as shown in FIG. 2 at the time of track-jumping. Referring now to FIG. 2, the radio frequency signal RFS has a relatively high voltage a when a light beam is positioned on the mirror region while it has a relatively low voltage b when a light beam is positioned on the track, that is, the region in which signal pits exist. In addition, in the case where a light beam is positioned on a defect area or region, the radio frequency signal RFS has a lower voltage c, hereinafter referred to as "low-voltage noise", than the voltage b when a light beam is positioned on the track. Such a radio frequency signal RFS is applied to the signal detection and hold part 12 after it is amplified with a predetermined gain by means of the first operational amplifier 11. The signal detection and hold part 12 detects an envelope signal of the amplified radio frequency signal RFS outputted from the first operational amplifier. The signal detection and hold part 12 detects the peak voltage a and the bottom voltage in the radio frequency signal RFS outputted from the first operational amplifier 11 and holds them during a certain time, respectively. As a result, the signal detection and hold part 12 generates a peak voltage signal TS and a bottom voltage signal BS. Circuits for detecting the peak voltage and the bottom voltage from the amplified radio frequency signal RFS can be configured by capacitors, diodes and current sources, etc. In these circuits, a time constant of the bottom voltage detecting circuit is established to have such a relatively short value that an error component caused by a vibration of the disc occurring at the time of a rotation of disc can be detected. The second operational amplifier 13 makes a differential amplification of the bottom envelop signal BS and the peak envelop signal TS applied to its non-inverting terminal(+) and its inverting terminal(−), respectively, from the signal detection and hold part 12, thereby generating a peak voltage signal CRF which is compensated for noises occurred by rotation of the disc. As a result, the first and second operational amplifiers 11 and 13 and the signal detection and hold part 12 serve to detect a peak waveform of the radio frequency signal RFS correcting an error amount of the radio frequency signal RFS based on a minute change in the driving condition of the disc.

Furthermore, the conventional mirror signal detecting circuit includes a smoothing part 14 for converting the corrected peak voltage signal CRF from the second operational amplifier 13 into a direct current voltage, and a comparator 15 for comparing the corrected peak voltage signal with an output signal of the smoothing part 14. The smoothing part generates an average voltage of the corrected peak voltage signal CRF. To this end, the smoothing part 14 is composed of a first and second resistors R1 and R2 that are connected in serial between a first node N1 and a ground voltage source GND, a third operational amplifier 16 and a diode D1 that are connected in a loop shape between a second node N2 positioned in the middle of the resistors R1 and R2 and a third node N3, and a capacitor C1 connected between the third node N3 and the ground voltage source GND. The first and second resistors R1 and R2 makes a voltage division of the corrected peak voltage signal CRF passing through the first node N1 from the second operational amplifier 13 and applies the voltage-divided peak voltage signal to a non-inverting terminal(+) of the third operational amplifier 16 connected with the second node N2. The third operational amplifier 16 makes a differential amplification of the voltage-divided peak voltage signal from the second node N2 and a average voltage signal IVS fed-back from the third node N3 into its inverting terminal (−). The diode D1 charges only higher voltage components than its operation voltage in the output signal of the third operational amplifier 16, via the third node N3, into the capacitor C1. The capacitor C1 is charged and discharged in accordance with a voltage signal from the diode D1, thereby allowing an average voltage signal IVS to appear on the third node N3. When a radio frequency signal RFS includes a low-voltage noise, the average voltage signal IVS increases suddenly and then decreases slowly in a region where the low-voltage noise is positioned. The comparator 15 compares the corrected peak voltage signal CRF from the first node N1 with the average voltage signal IVS from the third node N3 to generate a rectangular mirror signal MS. This mirror signal maintains a high logic when a level of the corrected peak voltage signal CRF is higher than that of the average voltage signal IVS, that is, when a light beam is positioned on the mirror region; while it maintains a low logic when a level of the corrected peak voltage signal CRF is lower than that of the average voltage signal IVS, that is, when a light beam is positioned on the track. Also, when the corrected radio frequency signal CRF includes a low-voltage noise c, as shown in FIG. 2, an error component d having a high logic state during a certain interval from a starting point of the low-voltage noise is generated in the mirror signal MS.

As described above, if a disc has a defect area due to a dust or a scratch or the like, then a low-voltage noise caused by the defect area is generated in the radio frequency signal at the time of time search or variable bit rate control so that a mirror signal derived from the radio frequency signal can not identify the mirror region and the track temporarily. Owing to this, the disc driver can not accurately recognize the number of tracks which is passed through by a light beam, that is, which is jumped, and at the same time becomes to waste a long time for positioning a light beam onto a desired track. As a result, the conventional disc driver is unable to perform the time search or the variable bit rate control accurately.

SUMMARY OF THE INVENTION

Accordingly, it is an object of the present invention to provide a mirror signal detecting method and apparatus for a disc driver which can detect a mirror signal accurately even though a disc has a defect area.

Another object of the present invention is to provide a mirror signal detecting method and apparatus for a disc driver which can detect a mirror signal accurately even when a driving condition of a disc changes.

In order to attain these and other objects of the invention, a mirror signal detecting method according to one aspect of the present invention includes the steps of receiving a high frequency signal obtained from a disc having tracks arranged between mirror regions, removing a noise component caused by a defect area included the high frequency signal, detecting an intermediate voltage of the high frequency signal removing the noise component, and detecting a mirror signal from the high frequency signal by utilizing the intermediate voltage.

Further, a mirror signal detecting method according to another aspect of the present invention includes the steps of receiving a high frequency signal obtained from a disc having tracks arranged between mirror regions, detecting an envelop signal with a top-peak voltage from the high frequency signal, removing a noise component caused by a defect area from the envelope signal with the top-peak voltage signal, detecting an intermediate voltage of the envelope signal with the top-peak voltage removing the noise component, and detecting a mirror signal from the envelope signal with the top-peak voltage by utilizing the intermediate voltage.

Furthermore, a mirror signal detecting apparatus according to still another aspect of the present invention includes signal inputting means for receiving a high frequency signal obtained from a disc having tracks arranged between mirror regions, removing a noise component caused by a defect area included the high frequency signal from the signal inputting means, intermediate value detecting means for detecting an intermediate voltage of the high frequency signal from the noise removing means, and comparing means for detecting a mirror signal from the high frequency signal from the noise removing means by utilizing the intermediate voltage.

Moreover, a mirror signal detecting apparatus according to still another aspect of the present invention includes signal inputting means for receiving a high frequency signal obtained from a disc having tracks arranged between mirror regions, envelop detecting means for detecting an envelop signal with a top-peak voltage from the high frequency signal from the signal inputting means, noise removing means for removing a noise component caused by a defect area from the envelop signal with the top-peak voltage signal, intermediate value detecting means for detecting an intermediate voltage of the envelop signal with the top-peak voltage from the noise removing means, and comparing means detecting a mirror signal from the envelope signal with the top-peak voltage from the envelope detecting means by utilizing the intermediate voltage.

BRIEF DESCRIPTION OF THE DRAWINGS

These and other objects of the invention will be apparent from the following detailed description of the embodiments of the present invention with reference to the accompanying drawings, in which.

DETAILED DESCRIPTION OF THE PREFERRED EMBODIMENT

Figure 1:
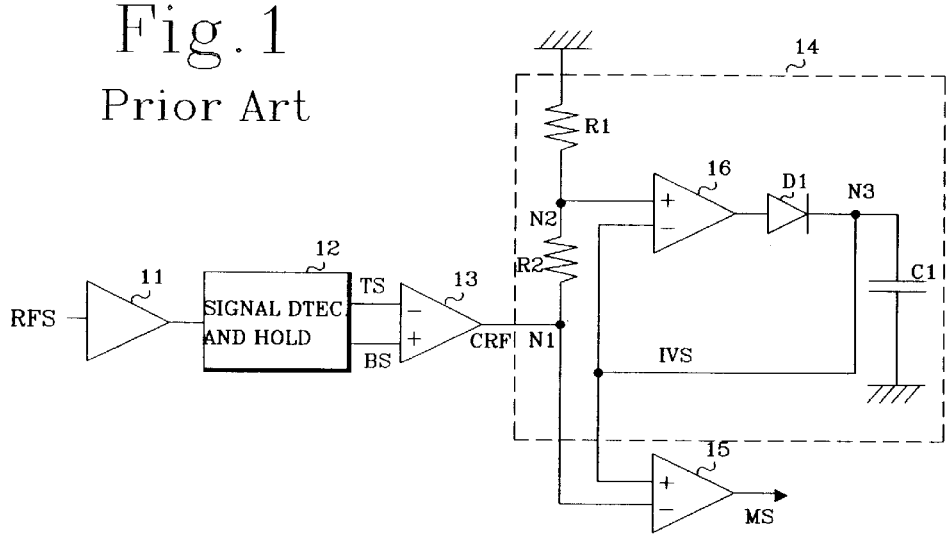
FIG. 1 is a schematic circuit diagram showing a configuration of a conventional mirror signal detecting circuit.
Figure 3:
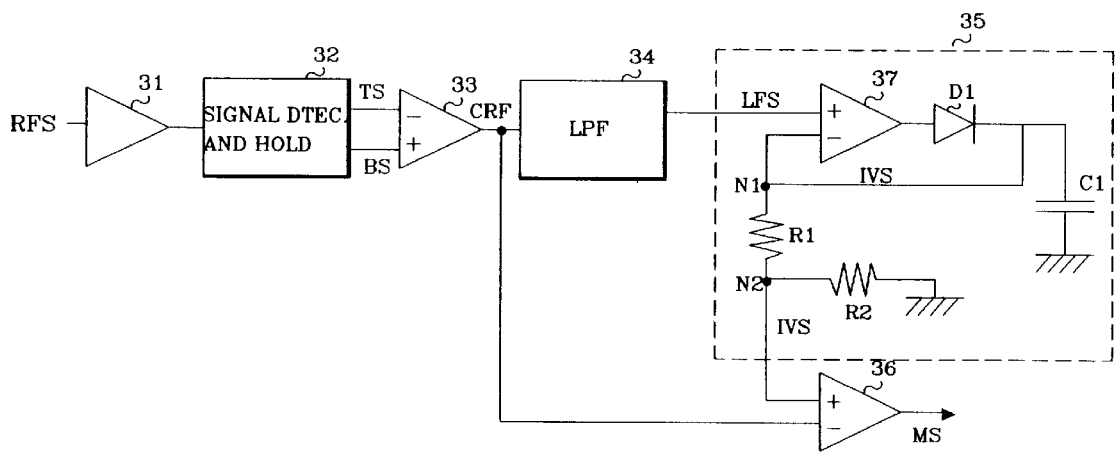
FIG. 3 is a schematic circuit diagram showing a configuration of a mirror signal detecting circuit according to an embodiment of the present invention.
Figure 2:
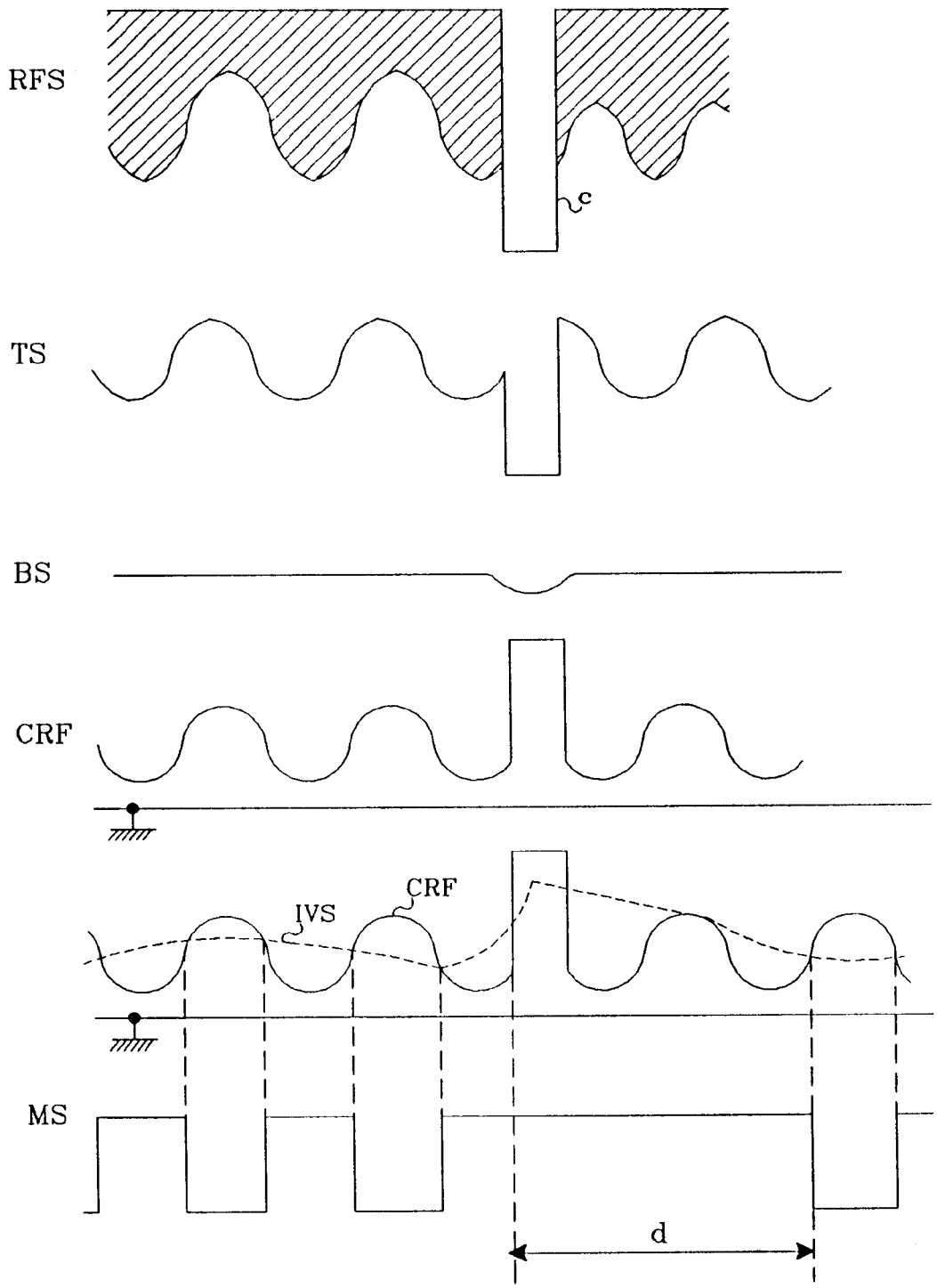
FIG. 2 is an output waveform diagram of each part of the circuit shown in FIG. 1.
Figure 4:
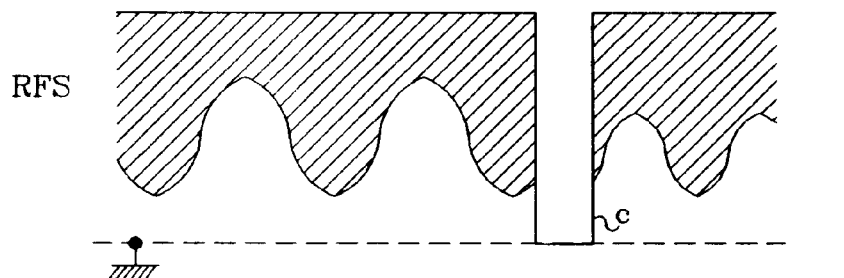
FIG. 4 is an output waveform diagram of each part of the circuit shown in FIG. 3.
Figure 4:
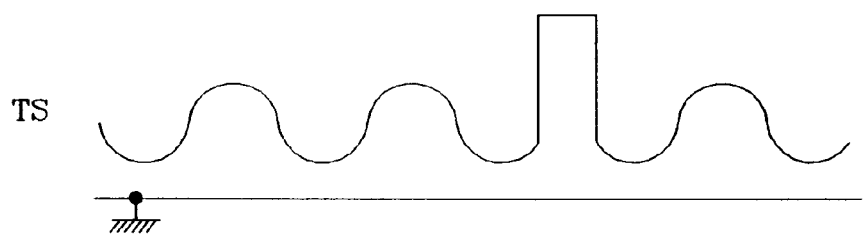
Figure 4:
Figure 4:
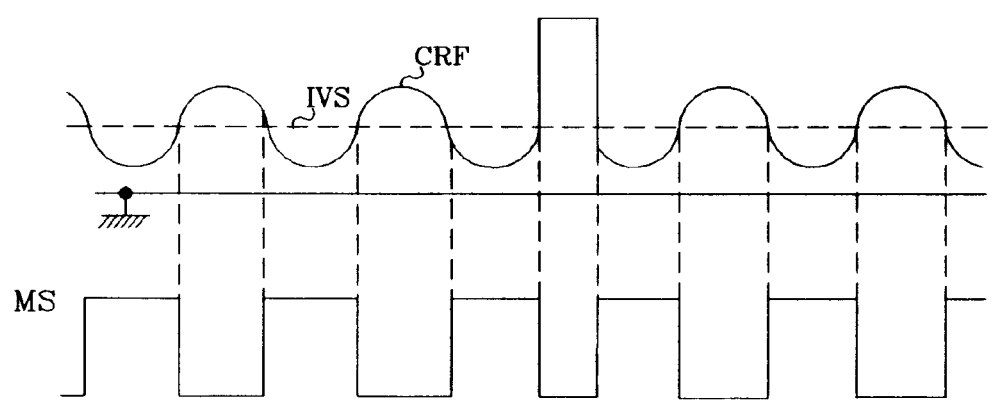

Referring to FIG. 3, there is shown a mirror signal detecting circuit according to an embodiment of the present invention. As shown in FIG. 3, the mirror signal detecting circuit includes a first operational amplifier 31 for receiving a radio frequency signal RFS, and a signal detection and hold part 32 and a second operational amplifier 33 which are connected to the operational amplifier 11 in serial. The radio frequency signal RFS is generated at a pickup, not shown, for converting a light signal reflected from the disc into an electrical signal, and which has a waveform as shown in FIG. 4 at the time of track-jumping. Referring now to FIG. 4, the radio frequency signal RFS has a relatively high voltage a when a light beam is positioned on the mirror region while it has a relatively low voltage b when a light beam is positioned on the track, that is, the region in which signal pits exist. In addition, in the case where a light beam is positioned on a defect area or region, the radio frequency signal RFS has a lower voltage c, hereinafter referred to as "low-voltage noise", than the voltage b when a light beam is positioned on the track. Such a radio frequency signal RFS is applied to the signal detection and hold part 32 after it is amplified with a predetermined gain by means of the first operational amplifier 31. The signal detection and hold part 32 detects an envelope signal of the amplified radio frequency signal RFS outputted from the first operational amplifier. The signal detection and hold part 32 detects the peak voltage and the bottom voltage in the radio frequency signal RFS outputted from the first operational amplifier 31 and holds them during a certain time, respectively. As a result, the signal detection and hold part 32 generates a peak voltage signal TS and a bottom voltage signal BS. The second operational amplifier 33 makes a differential amplification of the bottom envelop signal BS and the peak envelop signal TS applied to its non-inverting terminal(+) and its inverting terminal(−), respectively, from the signal detection and hold part 32, thereby generating a peak voltage signal CRF which is compensated for noises occurred by rotation of the disc. As a result, the first and second operational amplifiers 31 and 33 and the signal detection and hold part 32 serve to detect a peak waveform of the radio frequency signal RFS correcting an error amount of the radio frequency signal RFS based on a minute variation in the driving condition of the disc.

Furthermore, the mirror signal detecting circuit includes a low pass filter(LPF) 34 serially connected between an output terminal of the second operational amplifier 33 and a non-inverting terminal of a comparator 36, and a smoothing part 35. The LPF 34 makes a low-pass filtering of the peak voltage signal CRF from the second operational amplifier 33 to remove a high-voltage noise cb of impulse component included in the peak voltage signal CRF. As shown in FIG. 4, a high-voltage noise cb does not appear in the filtered peak voltage signal LFS outputted from the LPF 34. This results from the high-voltage noise cb being smoothed by means of the LPF 34. In order to smooth the high-voltage noise cb, a time constant of the LPF 34 is established to have a sufficiently long value enough to remove the high-voltage noise cb of impulse component. The smoothing part 35 generates an average voltage signal IVS of the filtered peak voltage signal LFS. To this end, the smoothing part 35 is composed of a third operational amplifier 37 for receiving the filtered peak voltage signal LFS from the LPF 34 and a voltage signal from a first node N1, a diode D1 connected between the third operational amplifier 37 and the first node N1, a first and second resistors R1 and R2 that are connected in serial between the first node N1 and a capacitor C1 connected between the first node N1 and the ground voltage source GND. The third operational amplifier 37 makes a differential amplification of the filtered peak voltage signal LFS applied to its non-inverting terminal(+) from the LPF 34 and a voltage signal applied to its inverting terminal(−) from the first node N1. The diode D1 charges only higher voltage components by its operation voltage than a voltage on the first node N1 on in the output signal of the third operational amplifier 37, via the first node N1, into the capacitor C1. The capacitor C1 is to charged and discharged in accordance with a voltage signal from the diode D1, and accordingly an intermediate value of the filtered peak voltage signal LFS appears on the first node N1. A voltage signal on the first node N1 maintains a certain voltage level even though the radio frequency signal RFS includes a low-voltage noise. This results from a high-voltage noise cb included in the peak voltage signal CRF being removed by means of the LPF 34. The two resistors R1 and R2 voltage-divide a voltage signal on the first node N1 and supplies the divided voltage signals, via the second node N2, to the non-inverting terminal(+) of the comparator 36 as an average voltage signal IVS. This average voltage signal IVS maintains a constant level like the voltage signal on the first node N1 even though the radio frequency signal RFS includes a low-voltage noise c. Next, the comparator 36 compares the peak voltage signal CRF from the second operational amplifier 33 with the average voltage signal IVS from the second node N2 to generate a rectangular mirror signal MS. This mirror signal maintains a high logic when a level of the peak voltage signal CRF is higher than that of the average voltage signal IVS, that is, when a light beam is positioned on the mirror region; while it maintains a low logic when a level of the voltage signal CRF is lower than that of the average voltage signal IVS, that is, when a light beam is positioned on the track. Also, even though the peak voltage signal CRF includes a high-voltage noise cb, that is, even when a light beam passes through a defect area, any errors do not occur in the mirror signal MS.

As described above, a mirror signal detecting circuit removes a low-voltage noise of impulse component suddenly decreasing due to a defect area caused by dust or scratch or the like with the aid of the low pass filter even though a light beam passes through the defect area, so that it can detect the mirror signal accurately and at the same time report the jumped track number to a disc driver. Accordingly, the disc driver can not only perform a track jump rapidly, but also it perform a time search accompanying a data retrieval and a variable bit rate control stabbly.

Although the present invention has been explained by the embodiment shown in the drawings described above, it should be understood to the ordinary skilled person in the art that the invention is not limited to the embodiments, but rather that various changes or modifications thereof are possible without departing from the spirit of the invention. Accordingly, the scope of the invention shall be determined only by the appended claims and their equivalents.

What is claimed is:

1. A mirror signal detecting method, comprising the steps of:
   receiving a high frequency signal obtained from a disc having tracks arranged between mirror regions;
   removing a noise component caused by a defect area included the high frequency signal;
   detecting an intermediate voltage of the high frequency signal removing the noise component; and
   detecting a mirror signal from the high frequency signal by utilizing the intermediate voltage.

2. The mirror signal detecting method recited by claim 1, wherein the step of detecting the intermediate voltage includes the steps of:
   voltage-dividing the high frequency signal removing the noise component;
   amplifying the voltage-divided signal; and
   low pass filtering the amplified signal and feeding-back the low pass filtered signal into the amplifying step.

3. The mirror signal detecting method recited by claim 2, wherein the step of detecting the mirror signal includes comparing the intermediate voltage with the high frequency signal removing the noise component to generate a rectangular waveform signal.

4. The mirror signal detecting method recited by claim 1, wherein the step of removing the noise component includes low pass filtering the high frequency signal.

5. A mirror signal detecting method, comprising the steps of:
   receiving a high frequency signal obtained from a disc having tracks arranged between mirror regions;
   detecting an envelop signal with a top-peak voltage from the high frequency signal;
   removing a noise component caused by a defect area from the envelop signal with the top-peak voltage signal;
   detecting an intermediate voltage of the envelop signal with the top-peak voltage removing the noise component; and
   detecting a mirror signal from the envelope signal with the top-peak voltage by utilizing the intermediate voltage.

6. The mirror signal detecting method recited by claim 5, wherein the step of detecting the intermediate voltage includes the steps of:

voltage-dividing the envelop signal with the top-peak voltage removing the noise component;

amplifying the voltage-divided envelop signal; and low pass filtering the amplified signal and feeding-back the low pass filtered signal into the amplifying step.

7. The mirror signal detecting method recited by claim 6, wherein the step of detecting the mirror signal includes comparing the intermediate voltage with the envelope signal with the top-peak voltage removing the noise component to generate a rectangular waveform mirror signal.

8. The mirror signal detecting method recited by claim 5, wherein the step of removing the noise component includes low pass filtering the high frequency signal.

9. The mirror signal detecting method recited by claim 5, wherein the step of detecting an envelop of the high frequency signal includes the steps of:

detecting a top-peak voltage component from the high frequency signal;

detecting a bottom-peak voltage component from the high frequency signal;

holding the top-peak and bottom-peak voltage components to output top-peak and bottom-peak voltages, respectively; and differentially amplifying the top-peak voltage signal and the bottom-peak voltage signal.

10. A mirror signal detecting apparatus, comprising:

signal inputting means for receiving a high frequency signal obtained from a disc having tracks arranged between mirror regions;

removing a noise component caused by a defect area included the high frequency signal from the signal inputting means;

intermediate value detecting means for detecting an intermediate voltage of the high frequency signal from the noise removing means; and comparing means for detecting a mirror signal from the high frequency signal from the noise removing means by utilizing the intermediate voltage.

11. The mirror signal detecting method recited by claim 10, wherein the intermediate value detecting means includes voltage dividing means for voltage-dividing the high frequency signal from the noise removing means;

amplifying means for amplifying an output signal of the voltage dividing means; and a feed-back loop for low pass filtering the output signal of the amplifying means and feeding-back the filtered signal into the amplifying means.

12. The mirror signal detecting method recited by claim 10, wherein the comparing means compares the intermediate voltage from the intermediate value detecting means with the high frequency signal from the noise removing means to generate a rectangular waveform mirror signal.

13. The mirror signal detecting method recited by claim 10, wherein the noise removing means includes a low pass filter for low pass filtering the high frequency signal from the signal inputting means.

14. A mirror signal detecting apparatus, comprising:

signal inputting means for receiving a high frequency signal obtained from a disc having tracks arranged between mirror regions;

envelop detecting means for detecting an envelop signal with a top-peak voltage from the high frequency signal from the signal inputting means;

noise removing means for removing a noise component caused by a defect area from the envelop signal with the top-peak voltage signal;

intermediate value detecting means for detecting an intermediate voltage of the envelop signal with the top-peak voltage from the noise removing means; and comparing means detecting a mirror signal from the envelope signal with the top-peak voltage from the envelope detecting means by utilizing the intermediate voltage.

15. The mirror signal detecting method recited by claim 14, wherein the intermediate value detecting means includes voltage dividing means for voltage-dividing the envelop signal with the top-peak voltage from the noise removing means;

amplifying means for amplifying an output signal of the voltage dividing means; and a feed-back loop for low pass filtering an output signal of the amplifying means and feeding-back the filtered signal into the amplifying means.

16. The mirror signal detecting method recited by claim 14, wherein the comparing means compares the intermediate voltage from the intermediate value detecting means with the envelope signal with the top-peak voltage from the envelope detecting means to generate a rectangular waveform mirror signal.

17. The mirror signal detecting method recited by claim 14, wherein the noise removing means includes a low pass filter for low pass filtering the envelop signal with the top-peak voltage from the envelop detecting means.

18. The mirror signal detecting method recited by claim 14, wherein the envelop detecting means is established into a short time constant suitable to detect a variation of the high frequency signal caused by a vibration of the disc at the time of rotation of the disc.

* * * * *